(12) United States Patent
Bettesworth et al.

(10) Patent No.: US 11,288,658 B2
(45) Date of Patent: *Mar. 29, 2022

(54) SYSTEM AND METHOD FOR AUTOMATIC DEVICE CONNECTION FOLLOWING A CONTACTLESS PAYMENT TRANSACTION

(71) Applicant: International Business Machines Corporation, Armonk, NY (US)

(72) Inventors: Gary Bettesworth, Basingstoke (GB); Andreas Martens, Fair Oak (GB); Sam Rogers, Eastleigh (GB); Paul S. M. Thorpe, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/549,823

(22) Filed: Aug. 23, 2019

(65) Prior Publication Data

US 2019/0378116 A1    Dec. 12, 2019

Related U.S. Application Data

(63) Continuation of application No. 15/847,794, filed on Dec. 19, 2017.

(51) Int. Cl.
*G06Q 20/32* (2012.01)
*G06Q 20/40* (2012.01)

(52) U.S. Cl.
CPC ....... *G06Q 20/3278* (2013.01); *G06Q 20/401* (2013.01)

(58) Field of Classification Search
CPC ............. G06Q 20/3278; G06Q 20/322; G06Q 20/3227; H04W 12/08; H04L 63/10
See application file for complete search history.

(56) References Cited

U.S. PATENT DOCUMENTS

| | | | |
|---|---|---|---|
| 6,974,076 B1 * | 12/2005 | Siegel | G06Q 20/145 235/375 |
| 8,001,612 B1 * | 8/2011 | Wieder | H04L 67/306 726/28 |
| 9,111,193 B2 | 8/2015 | Poole et al. | |
| 9,578,157 B1 * | 2/2017 | Cansino | H04B 1/3822 |

(Continued)

OTHER PUBLICATIONS

Bolhuis, Martin, "Using an NFC-equipped mobile phone as a token in physical access control", University of Twente, pp. 77-78, Section 8.2., and rest of document: https://web.archive.org/web/20170809005026/https://essay.utwente.nl/65419/1/thesis_nfc_martijn_bolhuis_final.pdf (Year: 2014).*

(Continued)

*Primary Examiner* — Ryan D Donlon
*Assistant Examiner* — Mark A Malkowski
(74) *Attorney, Agent, or Firm* — Cuenot, Forsythe & Kim, LLC

(57) ABSTRACT

Contactless payment data can be received from a mobile device via a contactless payment terminal. Responsive to receiving the contactless payment data from the mobile device, a token can be communicated to the mobile device via the contactless payment terminal, the token configured to be processed by the mobile device to initiate a particular communication functionality by the mobile device.

4 Claims, 4 Drawing Sheets

(56) References Cited

U.S. PATENT DOCUMENTS

| | | | | |
|---|---|---|---|---|
| 9,667,631 | B2 | 5/2017 | Rybak et al. | |
| 10,346,471 | B2* | 7/2019 | Goldin | H04W 4/027 |
| 10,685,503 | B2* | 6/2020 | Ricci | G06F 16/248 |
| 11,042,816 | B2* | 6/2021 | Zaid | H04W 12/08 |
| 2006/0236369 | A1* | 10/2006 | Covington | H04L 9/3271 |
| | | | | 726/1 |
| 2009/0205032 | A1* | 8/2009 | Hinton | H04L 63/0815 |
| | | | | 726/7 |
| 2009/0266884 | A1 | 10/2009 | Killian et al. | |
| 2013/0084934 | A1* | 4/2013 | Young | G07F 17/3216 |
| | | | | 463/16 |
| 2013/0221094 | A1* | 8/2013 | Smith | G07C 9/00309 |
| | | | | 235/382 |
| 2013/0282502 | A1* | 10/2013 | Jooste | G06Q 20/363 |
| | | | | 705/21 |
| 2014/0304094 | A1 | 10/2014 | Reddy et al. | |
| 2015/0084736 | A1* | 3/2015 | Horton | H04B 5/0056 |
| | | | | 340/5.7 |
| 2016/0001720 | A1* | 1/2016 | Vadgama | G07C 5/008 |
| | | | | 701/2 |
| 2016/0019536 | A1* | 1/2016 | Ortiz | G06Q 20/3227 |
| | | | | 705/67 |
| 2016/0055485 | A1 | 2/2016 | Benoit et al. | |
| 2016/0063459 | A1* | 3/2016 | Li | G06Q 20/321 |
| | | | | 705/39 |
| 2016/0140649 | A1* | 5/2016 | Kleve | H04W 12/04 |
| | | | | 705/307 |
| 2016/0162862 | A1 | 6/2016 | Royyuru et al. | |
| 2016/0191590 | A1* | 6/2016 | Werkelin Ahlin | H04L 63/10 |
| | | | | 726/4 |
| 2016/0217462 | A1* | 7/2016 | Gaur | G06Q 20/202 |
| 2017/0006434 | A1 | 1/2017 | Howe et al. | |
| 2018/0063111 | A1* | 3/2018 | Vasudevan | H04L 63/18 |
| 2018/0091930 | A1* | 3/2018 | Jefferies | H04L 63/08 |
| 2018/0262891 | A1* | 9/2018 | Wu | G07C 9/00857 |
| 2019/0188684 | A1 | 6/2019 | Beiiesworth et al. | |
| 2020/0128595 | A1* | 4/2020 | Dees | H04W 76/14 |
| 2020/0359059 | A1* | 11/2020 | Zhang | H04N 21/462 |

OTHER PUBLICATIONS

Wi-Fi Simple Configuration Technical Specification Version 2.0.5 (See p. 2 for version information); https://www.wi-fi.org/download.php?file=/sites/default/files/private/Wi-Fi_Simple_Configuration_TechnicaLSpecification_v2.0.5.pdf (Year: 2014) (Year: 2014).*

Wi-Fi Simple Configuration Technical Specification Version 2.0.5 (See p. 2 for version information); https://www.wi-fi.org/download.php?file=/sites/default/files/private/Wi-Fi_Simple_Configuration_TechnicaLSpecification_v2.0.5.pdf (Year: 2014).*

Wei, "HIBS-KSharing: Hierarchical Identity-Based Signature Key Sharing for Automotive", https://ieeexplore.IEEE.org/document/8013676, Aug. 21, 2017 (Year: 2017).*

IBM: List of IBM Patents or Patent Applications Treated as Related, 2 pg.

Bettesworth, G. et al., "System and Method for Automatic Device Connection Following a Contactless Payment Transaction", U.S. Appl. No. 15/847,794, filed Dec. 19, 2017, 31 pages (A copy is not provided as this application is available to the Examiner.).

"ApplePay," [online] Apple Inc. © 2017, [retrieved Dec. 19, 2017] retrieved from the Internet: <https://www.apple.com/apple-pay/>, 9 pg.

"AndroidPay," [online] Astrium, Digital Globe © 2014 [retrieved Dec. 19, 2017] retrieved from the Internet: <https://www.android.com/pay/>, 14 pg.

"Setup Time Limit for Guest Wifi Users," [online] Spiceworks, Inc. ©Copyright 2006-2017, Feb. 11, 2013 [retrieved Dec. 19, 2017] retrieved from the Internet: <https://community.spiceworks.com/topic/301828-setup-time-limit-for-guest-wifi-users>, 4 pg.

Summerson, C., "Android "L" Feature Spotlight: Write Wi-Fi Passwords to NFC Tags Directly from Android," [online] Illogical Robot LLC © 2009-2017, Jun. 27, 2014 [retrieved Dec. 19, 2017] retrieved from the Internet: <http://www.androidpolice.com/2014/06/27/android-I-feature-spotlight-write-wi-fi-passwords-to-nfc-tags-directly-from-android/>, 8 pg.

Wei, Z. et al., "Hibs-ksharing: Hierarchical Identity-Based Key Sharing for Automotive," IEEE Access, vol. 5, pp. 16314-16323, Aug. 21, 2017.

"Wi-Fi Protected Setup," [online] Wikipedia, Dec. 11, 2017 [retrieved Dec. 19, 2017] retrieved from the Internet: <https//en.wikipedia.org/w/index.php?title=Wi-Fi_Protected_Setup&oldid=814838805>, 7 pg.

* cited by examiner

SYSTEM AND METHOD FOR AUTOMATIC DEVICE CONNECTION FOLLOWING A CONTACTLESS PAYMENT TRANSACTION

BACKGROUND

The present invention relates to point of sale systems and, more particularly, point of sale systems that use contactless payment terminals.

Contactless payment terminals oftentimes are used to receive mobile payment data from mobile devices, for example using near field communication (NFC). NFC is a is a set of communication protocols that enable two electronic devices, one of which usually is a mobile device (e.g., a smartphone, tablet computer, etc.), to establish communication by bringing the devices within a threshold distance (e.g., 4 cm) of one another. Payments received via NFC are similar to those received for credit/debit card transactions, but allow mobile payment to be used in lieu of using physical cards. This is sometimes referred to as contactless NFC (CTLS NFC or NFC/CTL).

SUMMARY

A method includes receiving contactless payment data from a mobile device via a contactless payment terminal. The method also can include, responsive to receiving the contactless payment data from the mobile device, communicating, using a processor, a token to the mobile device via the contactless payment terminal, the token configured to be processed by the mobile device to initiate a particular communication functionality by the mobile device.

A system includes a processor programmed to initiate executable operations. The executable operations include receiving contactless payment data from a mobile device via a contactless payment terminal. The executable operations also can include, responsive to receiving the contactless payment data from the mobile device, communicating a token to the mobile device via the contactless payment terminal, the token configured to be processed by the mobile device to initiate a particular communication functionality by the mobile device.

A computer program includes a computer readable storage medium having program code stored thereon. The program code is executable by a processor to perform a method. The method includes receiving, by the processor, contactless payment data from a mobile device via a contactless payment terminal. The method also can include, responsive to receiving the contactless payment data from the mobile device, communicating, by the processor, a token to the mobile device via the contactless payment terminal, the token configured to be processed by the mobile device to initiate a particular communication functionality by the mobile device.

DETAILED DESCRIPTION

Figure 1:
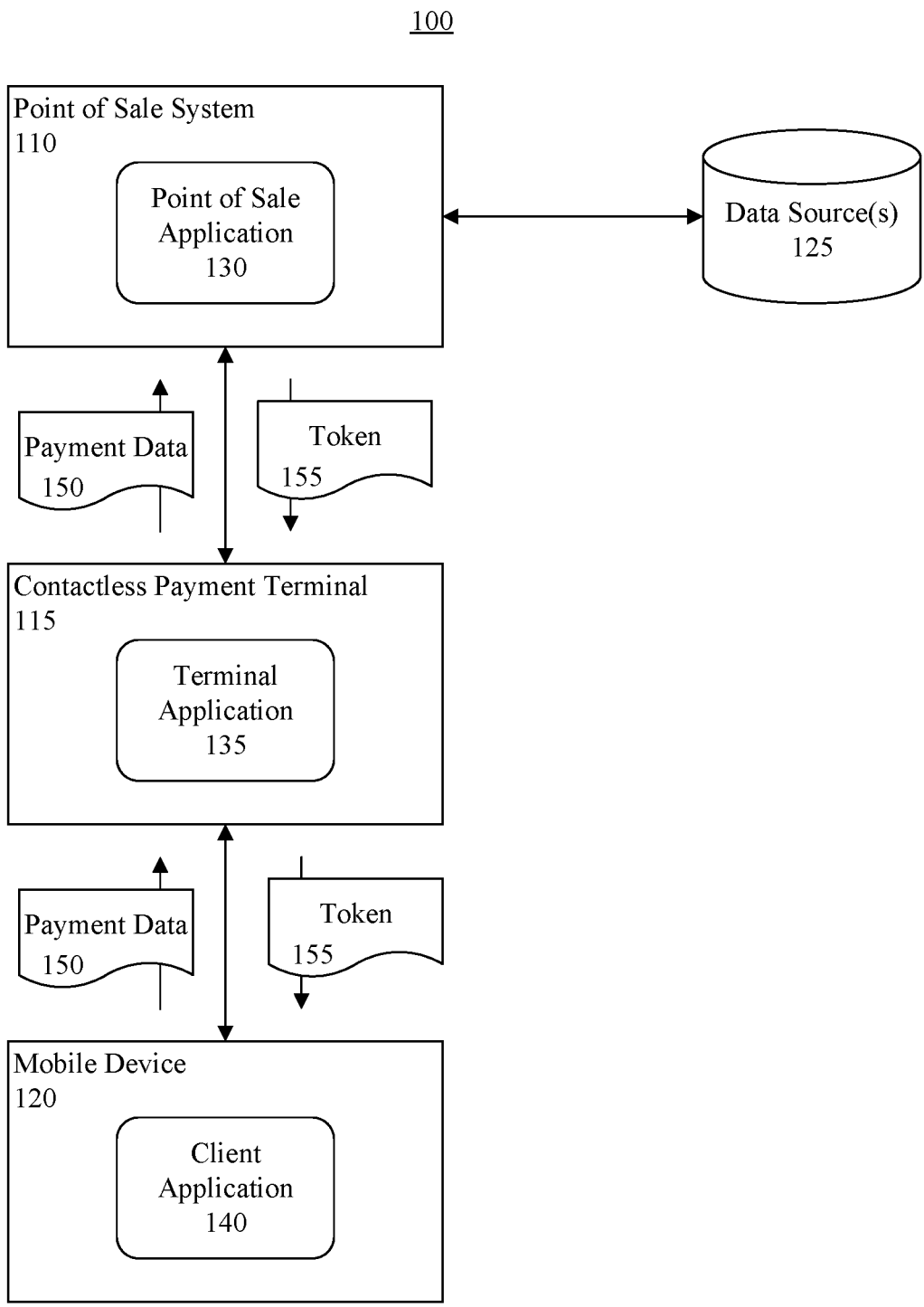
FIG. 1 is a block diagram illustrating an example of a computing environment.

This disclosure relates to point of sale systems and, more particularly, point of sale systems that use contactless payment terminals. In accordance with the inventive arrangements disclosed herein, a point of sale system can receive contactless payment data from a mobile device via a contactless payment terminal. In response, the point of sale system can communicate a token to the mobile device via the contactless payment terminal. The token can be configured to be processed by the mobile device to initiate a particular communication functionality by the mobile device.

In illustration, the mobile device can use the token to connect to, and authenticate with, a communication network. For instance, the token can include WiFi Protected Setup (WPS) data the mobile device can use to establish presence on a WiFi™ network. In another example, the token can include data configured to enable the mobile device to initiate a content presentation system (e.g., a juke box) to present content (e.g., one or more songs and/or videos). In another arrangement, the token can include data enabling the mobile device 120 to operate as a digital key to unlock a door of a room or other facility, to unlock a door of a vehicle, to operate the vehicle, etc.

Several definitions that apply throughout this document now will be presented.

As defined herein, the term "token" means a functional data structure (e.g., a data file) configured to be communicated to a mobile device via a contactless payment terminal and processed by the mobile device to initiate at least one communication functionality by the mobile device.

As defined herein, the term "contactless communication link" means a wireless communication link between two systems/devices/apparatuses having a range not greater than about 20 cm that does not require use of network infrastructure, such as routers, firewalls, switches, access points and the like. A near field communication (NFC) link is an example of a contactless communication link.

As defined herein, the term "contactless payment transaction" means a payment transaction in which a mobile device wirelessly communicates, over a contactless communication link, payment data to a point of sale system via a contactless payment terminal.

As defined herein, the term "point of sale system" means a data processing system including at least one processor and memory that is used to conduct sales transactions for sales of products/services to customers, and that is located at a physical location where the customers are located during the sales transactions, for example within a store, at a kiosk, etc. A point of sale system also may include a display, a barcode scanner, a receipt printer and a contactless payment terminal. Network infrastructure, such as routers, firewalls, switches, access points and the like, are not point of sale systems as the term "point of sale system" is defined herein.

As defined herein, the term "contactless payment terminal" means a system that is used to wirelessly communicate with a mobile device to receive from the mobile device contactless payment data for a contactless payment, for example using near field communication (NFC), and communicate the contactless payment data to a point of sale system. The contactless payment terminal may be a component of the point of sale system, or can be communicatively linked to the point of sale system using a suitable communication protocol. Network infrastructure, such as routers, firewalls, switches, access points and the like, are not contactless payment terminals as the term "contactless payment terminal" is defined herein.

As defined herein, the term "mobile device" means a data processing system including at least one processor and memory that is used to make contactless payments and perform at least one other type of communication. Examples of a mobile device include, but are not limited to, a smart phone, a tablet computer, a smart watch, smart glasses, etc. Network infrastructure, such as routers, firewalls, switches, access points and the like, are not mobile devices as the term "mobile device" is defined herein.

As defined herein a direct wireless communication link is a wireless communication link between two systems/devices/apparatuses that does not require use of network infrastructure, such as routers, firewalls, switches, access points and the like. A Bluetooth® communication link and a Bluetooth® Low Energy (BLE) communication link are examples of a direct wireless communication link.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being).

As defined herein, the term "customer" means a person (i.e., a human being).

FIG. 1 is a block diagram illustrating an example of a computing environment 100. The computing environment 100 can include a point of sale system 110, a contactless payment terminal 115 and a mobile device 120. In one arrangement, the contactless payment terminal 115 can be a component of the point of sale system 110. In another arrangement, the contactless payment terminal 115 can be a component separate from the point of sale system 110, but can be communicatively linked to the point of sale system 110. Further, the computing environment 100 can include one or more data sources 125 that store data generated by, and accessed by, the point of sale system 110. The data source(s) 125 also can store other data. The data source(s) 125 can include, for example, one or more databases or other suitable storage systems. For example, the point of sale system 110 could call one or more application programming interfaces (APIs), examples of which include, but are not limited to restful (REST) APIs. The APIs can be hosted by the point of sale system 110 and/or one or more other systems to which the point of sale system 110 is communicatively linked, for example APIs hosted in a cloud computing environment.

The point of sale system 110 can be communicatively linked to the data source 125 via a communication network, for example a wide area network (WAN), a local area network (LAN), a wireless network, a mobile network, a Virtual Private Network (VPN), the Internet, the Public Switched Telephone Network (PSTN), etc. The point of sale system 110 can be communicatively linked to the contactless payment terminal 115 via a direct wired communication link, a direct wireless communication link (e.g., Bluetooth®, Bluetooth® Low Energy (BLE), etc.), a contactless communication link (e.g., a NFC link), a LAN, a wireless network, etc. The contactless payment terminal 115 can be communicatively linked to the mobile device 120 via a contactless communication link (e.g., a NFC link).

The point of sale system 110 can execute a point of sale application 130 configured to process purchase/sales transactions and interface with the contactless payment terminal 115. In a non-limiting arrangement, one or more of such functions can be performed by an operating system of the point of sale system 110. For example, the operating system can be programmed with such functionality.

The contactless payment terminal 115 can execute a terminal application 135 configured to interface with the point of sale system 110 and the mobile device 120, and conduct contactless communication interactions with the mobile device 120 during purchase/sales transactions. In a non-limiting arrangement, the terminal application can reside in firmware of the contactless payment terminal 115. In a non-limiting arrangement, one or more of such functions can be performed by an operating system of the point of sale system 110. For example, the operating system can be programmed with such functionality. In a further a non-limiting arrangement, rather than the terminal application 135, the contactless payment terminal 115 can include a programable integrated circuit (e.g., a field programmable gate array) programmed to perform functions described herein as being performed by the terminal application 135.

The mobile device 120 can execute a client application 140 configured to perform various processes described herein as being performed by the mobile device 120. In a non-limiting arrangement, one or more of such functions can be performed by an operating system of the mobile device 120. For example, the operating system can be programmed with such functionality.

In operation, during a purchase transaction, the point of sale application 130 can receive payment data 150 from the mobile device 120 via the contactless payment terminal 115, for example near-field communication (NFC) payment processes. The payment data 150 can indicate an account to charge to receive money or other currency for the purchase transaction, for example a credit card account, a debit card account, a bank account, or any other type of account that may be charged to collect money or other currency for the purchase transaction.

In response to receiving the payment data 150, the point of sale application 130 can determine a token 155, and communicate the token 155 to the mobile device 120 via the contactless payment terminal. For example, the point of sale application 130 can access the data source(s) 125. From the data source(s) 125, the point of sale application 130 can retrieve data to be used to determine the token 155. Further, the point of sale application 130 can access from the data source(s) 125 user profile data for a user of the mobile device 120 providing the payment data 150, or a user of an account indicated in the payment data 150 to make payment for the purchase transaction. In one arrangement, the point of sale application 130 can create the token 155 from a token shell and include in the token 155 certain data received from and/or determined (e.g., derived) from the data source(s) 125 applicable to use of the token 155 by the mobile device 120. In another arrangement, the point of sale application 130 can access and retrieve the token 155 from the data source(s) 125. Regardless of whether the point of sale application 130 creates the token 155 or receives the token 155 from the data source(s) 125, the point of sale application 130 can determine (e.g., derive) certain data to include in the token 155 based on data received from the data source(s) 125, for example data indicating a particular use of the token 155, data indicating a time frame in which the token 155 may be used by the mobile device 120, data indicating a duration of time for which communication functionality provided by the token 155 may be used, and so on.

The point of sale system 110 can communicate the token 155 to the contactless payment terminal 115, and the contactless payment terminal 115 can communicate the token 155 to the mobile device using NFC. The token 155 can be configured to be processed by the client application 140 (or operating system) of the mobile device 120 to initiate a particular communication functionality by the mobile device 120. In one non-limiting arrangement, the token 155 can be a cryptographic token, which can include a cryptographic key (e.g., a digital signature) that provides access to something, for example a communication network (e.g., WiFi™ network), a physical structure (e.g., room or building) protected by a door lock, a vehicle protected by a door lock and secured ignition system, a content media system, and so on.

The point of sale application 130 can determine the token 155 in a variety of ways, and there may be a variety of communication functionalities that may be initiated, depending on the particular token 155 that is received by the mobile device 120. The following example use cases describe various ways in which tokens 155 may be used to initiate communication functionalities by the mobile device 120.

Example Use Case 1

The token 155 can include an identifier or a file configured to authenticate the mobile device on a communication network, for example communication network identification data and authentication data to be used by the mobile device 120 to access and authenticate with the communication network in order to establish presence on the communication network. In illustration, the token 155 can include WiFi Protected Setup (WPS) data that identifies the communication network and includes an identifier (e.g., a personal identification number (PIN)), an encrypted file, or other authentication data to be used by the mobile device 120 to authenticate with the communication network. In response to receiving the token 155, the client application 140 can initiate connection to, and authentication with, the communication network (e.g., a WiFi™ network). The client application 140 can initiate the connection/authentication automatically, or in response to receiving a user input to initiate the connection/authentication. For example, the client application 140 can present a user selectable user interface item (e.g., icon, button, menu item, etc.) which the user may select to initiate connection/authentication with the communication network.

In an arrangement, the point of sale application 130 can determine a unique identifier for the mobile device 120, for example a media access control (MAC) address of the mobile device 120. In illustration, the contactless payment terminal 115 can determine the unique identifier during a NFC session with the mobile device 120 and communicate the unique identifier to the point of sale application 130, or the unique identifier can be included in the payment data 150 received by the contactless payment terminal 115 and communicated to the point of sale application 130. The point of sale application 130 can include the unique identifier in the token 155, for example within the WPS data. The communication network can be configured to authenticate the mobile device 120 with the communication network only if the unique identifier in the WPS data matches the MAC address of the mobile device 120 attempting to authenticate with the communication network. Accordingly, the token 155 may only be used by the mobile device 120 to establish presence on the communication network.

In an arrangement, the token 155 further can specify a time frame and/or an amount of time for which the mobile device 120 is authorized to use the communication network. In illustration, assume the point of sale system 110 is located in a coffee shop. In response to the user purchasing a cup of coffee using the contactless payment terminal 115, the point of sale application 130 can include in the token 155 data indicating that the mobile device 120 is authorized to access a WiFi™ network provided by the coffee shop for a default duration of time (e.g., fifteen minutes). If the user makes a larger purchase, for example purchases food and coffee, the point of sale application 130 can include in the token 155 data indicating that the mobile device 120 is authorized to access a WiFi™ network for a greater amount of time (e.g., thirty minutes). In this regard, the amount of time specified by the token 155 can be based, at least in part, on the price of the purchase that is the subject of the purchase transaction.

In another aspect, the point of sale application 130 can determine the time frame and/or duration of time based on, for example, user profile data of the user of the mobile device 120, which the point of sale application 130 can access from the data source(s) 125. In illustration, each time the user makes a purchase in the coffee shop, the point of sale application 130 can identify the user via the payment data 150, determine customer reward points for the user based on the amount of the purchase transaction, and store the customer reward points in the user's user profile data. The customer reward points can expire after a certain period of time following the purchase transaction, though this need not be the case. During a present purchase transaction, the point of sale application 130 can determine a total number of customer reward points (e.g., unexpired customer reward points) stored in the user profile, and determine the time frame and/or duration of time based on the total number of customer reward points. For instance, if the total number of customer reward points exceeds a first threshold value, the point of sale application 130 can include in the token 155 data indicating that the mobile device 120 is authorized to access the WiFi™ network provided by the coffee shop for a second duration of time (e.g., thirty minutes). If the total number of customer reward points exceeds a second threshold value, the point of sale application 130 can include in the token 155 data indicating that the mobile device 120 is authorized to access the WiFi™ network provided by the coffee shop for a third duration of time (e.g., forty-five minutes), and so on.

In a further aspect, the token 155 further can specify a quality of service (QoS) to be provided by the mobile device 120 based on the price of the purchase that is the subject of the purchase transaction and/or the total number of customer reward points (e.g., unexpired customer reward points) stored in the user profile. The specified QoS can be, for example, a bandwidth provided by the communication network to the mobile device 120, a maximum amount of data the mobile device 120 may transmit and/or receive via the communication network, a guaranteed minimum level of latency for communications between the mobile device 120 and the communication network, and so on.

The user can initiate the mobile device 120 to use the token 155 to establish presence on the communication network, for example by interacting with the client application 140. In one arrangement, the client application 140 can monitor an amount of time the mobile device 120 is connected to the communication network. In response to the mobile device 120 using (e.g., being connected to) the communication network for the amount of time specified by the token 155, the client application 140 can automatically disconnect the mobile device 120 from the communication network. In another arrangement, during authentication with the communication network, the mobile device 120 (e.g., the client application 140) can communicate the token 155, or data specified by the token 155 indicating the duration of time the mobile device 120 is authorized to use the communication network, to network infrastructure (e.g., a router) of the communication network. In response to the mobile device 120 using (e.g., being connected to) the communication network for the amount of time specified by the token 155, the network infrastructure can automatically disconnect the mobile device 120 from the communication network. In either scenario, the client application 140 can be configured to present an indication to the user to alert the user that the mobile device 120 is going to be disconnected from the communication network before the time expires, for example by presenting a timer showing how much time is left, presenting a pop up window at a threshold period of time before the mobile device 120 is to be disconnected form the communication network, etc.

Example Use Case 2

The token 155 can include data configured to enable the mobile device 120 to initiate a content presentation system to present content. In illustration, the content presentation system can be a juke box, and the token 155 can indicate a number of songs and/or videos for which the mobile device 120 may use the token 155 to select and initiate playback. For example, assume the point of sale system 110 is located in a restaurant or pub. In response to the user purchasing food and/or drinks using the contactless payment terminal 115, the point of sale application 130 can include in the token 155 data indicating that the mobile device 120 is authorized the juke box and initiate playback of a specified number of songs. The number of songs can be determined by the point of sale application 130 based on the amount of money the user spent during the purchase transaction in which the user purchased the food/drinks and/or based on the user's user profile. The user profile can indicate customer reward points awarded to the user based on previous and current purchases, as previously described with respect to the above example use case 1, and those customer reward points can be used to determine the number of songs the user may select and initiate playback using the mobile device 120.

The mobile device 120 can interface with the content presentation system via a communication link, such as a contactless communication link or a direct wireless communication link, for example at the behest of the user of the mobile device 120. Via the communication link, the mobile device 120 can communicate requests to the content presentation system to initiate the content presentation system to initiate playback of content selected by the user. In illustration, in response to establishing a communication link with the content presentation system, the content presentation system can communicate to the mobile device 120 a menu of available content, which the client application 140 can present to the user, for example on a display of the mobile device 120. Via the menu, the user can select content to be presented, and the client application can communicate to the content presentation a request to initiate playback of the selected content.

In one arrangement, the client application 140 can limit the number of content (e.g., number of songs and/or videos) which the user may selected to a number specified by the token 155. In another arrangement, the mobile device 120 can communicate the token 155, or data from the token 155 specifying the number of content the user may select, to the content presentation system. The content presentation system can indicate in the menu the number of content the user may select, and configure the menu to only allow the user to select up to that number of content.

Example Use Case 3

The token 155 can include data enabling the mobile device 120 to operate as a digital key to unlock a door of a room (e.g., a hotel room, a motel room, a conference room, etc.). In illustration, assume a user is checking into a hotel and paying for the hotel stay using NFC established between the mobile device 120 and the contactless payment terminal 115. In response to receiving the payment data 150 from the contactless payment terminal 115, the point of sale application 130 can assign a room to the user, or identify a room that is assigned to the user, and access from the data source(s) 125 a cryptographic token, which may be assigned to that room or which can be configured to be assigned to that room. The point of sale application 130 can create the token 155 using the accessed cryptographic token. For example, the point of sale application 130 can copy the cryptographic token and add additional data to the copy to create the token 155. As noted, the point of sale application 130 can communicate the token 155 to the mobile device 120 via the contactless payment terminal 115. Using the client application 140, the mobile device 120 can establish a NFC link with the door lock (or other lock for the room) and communicate data contained in the token 155 to the door lock to unlock the door, thereby allowing the user to enter and use the room.

The additional data added to the copy of the cryptographic token to create the token 155 can include data assigned to the room, thereby making the token 155 only usable to unlock the door(s) of the assigned room. In illustration, responsive to receiving the payment data 150, the point of sale system can assign an encrypted unique identifier to the assigned room, communicate the encrypted unique identifier to the door lock(s) of the room (or any other locks in the room) to configure the door locks to only be opened by use of the token 155 and a master token/keycard, and add the encrypted unique identifier to the token 155. The additional data also can indicate a time frame in which the token 155 may be used to unlock the door. The client application 140 can be configured to use the token 155 to unlock the door (or any other locks in the room) during the specified time frame.

The point of sale application 130 also can configure the lock(s) to stop recognizing the token 155 at the expiration of the specified time frame.

Example Use Case 4

The token 155 can include data enabling the mobile device 120 to operate as a digital key to unlock a door of a sporting facility (e.g., a squash court, a handball court, a basketball court, etc.). The point of sale system 110 can determine the token 155 in a manner similar to that described above for example use case 2, including additional data added to the token 155. Using the client application 140, the mobile device 120 can establish a NFC link with a door lock for the sporting facility and communicate data contained in the token 155 to the door lock to unlock the door, thereby allowing the user to enter and use the sporting facility.

In one aspect, the additional data can indicate a time frame or duration of time in which the token 155 may be used to unlock the door of the sporting facility. Further, the additional data can indicate a time frame or duration of time in which features of the sporting facility are available to the user. For example, the sporting facility can be configured with a data processing system that controls lights for the sporting facility. Responsive to the mobile device 120 being used to unlock the door of the sporting facility, the data processing system can receive from the door lock the data communicated the data communicated to the door lock by the mobile device 120 to unlock the door. From that data, the data processing system can turn on the lights, determine the time frame/amount of time the user is assigned access to the sporting facility, and turn off the lights at the expiration of the specified time frame or at the expiration of the specified duration of time.

Example Use Case 5

The token 155 can include data enabling the mobile device 120 to operate as a digital key to lock/unlock doors of a vehicle and to operate (e.g., start) the vehicle. In illustration, assume the user is renting a vehicle. In response to receiving the payment data 150 from the contactless payment terminal 115, the point of sale application 130 can assign a vehicle to the user, or identify a vehicle that is assigned to the user, and access from the data source(s) 125 a cryptographic token, which may be assigned to that vehicle or which can be configured to be assigned to that vehicle. The point of sale application 130 can create the token 155 using the accessed cryptographic token. For example, the point of sale application 130 can copy the cryptographic token and add additional data to the copy to create the token 155. As noted, the point of sale application 130 can communicate the token 155 to the mobile device 120 via the contactless payment terminal 115. Using the client application 140, the mobile device 120 can establish a communication link (e.g., a contactless communication link or a direct wireless communication link) with the vehicle and communicate data contained in the token 155 to the vehicle to lock/unlock the vehicle's door, start the vehicle, etc.

The additional data added to the copy of the cryptographic token to create the token 155 can include data assigned to the vehicle, thereby making the token 155 only usable to with the assigned vehicle. The additional data also can indicate a time frame in which the token 155 may be used to lock/unlock and operate the vehicle, though this need not be the case. Further, the additional data also can indicate features of the vehicle available to the user. In illustration, during the sales transaction for the vehicle rental, the user may request use of a navigation system in the vehicle or decline such use, and data indicating such decision can be added to the token 155. For instance, the fee charged for the vehicle rental can be based, at least in part, on the whether the user chooses to use the navigation system. The vehicle can include a data processing system that processes the token 155 and determines whether to make use of the navigation system available to the user based on whether the token 155 indicates that the navigation system is to be available.

Figure 2:
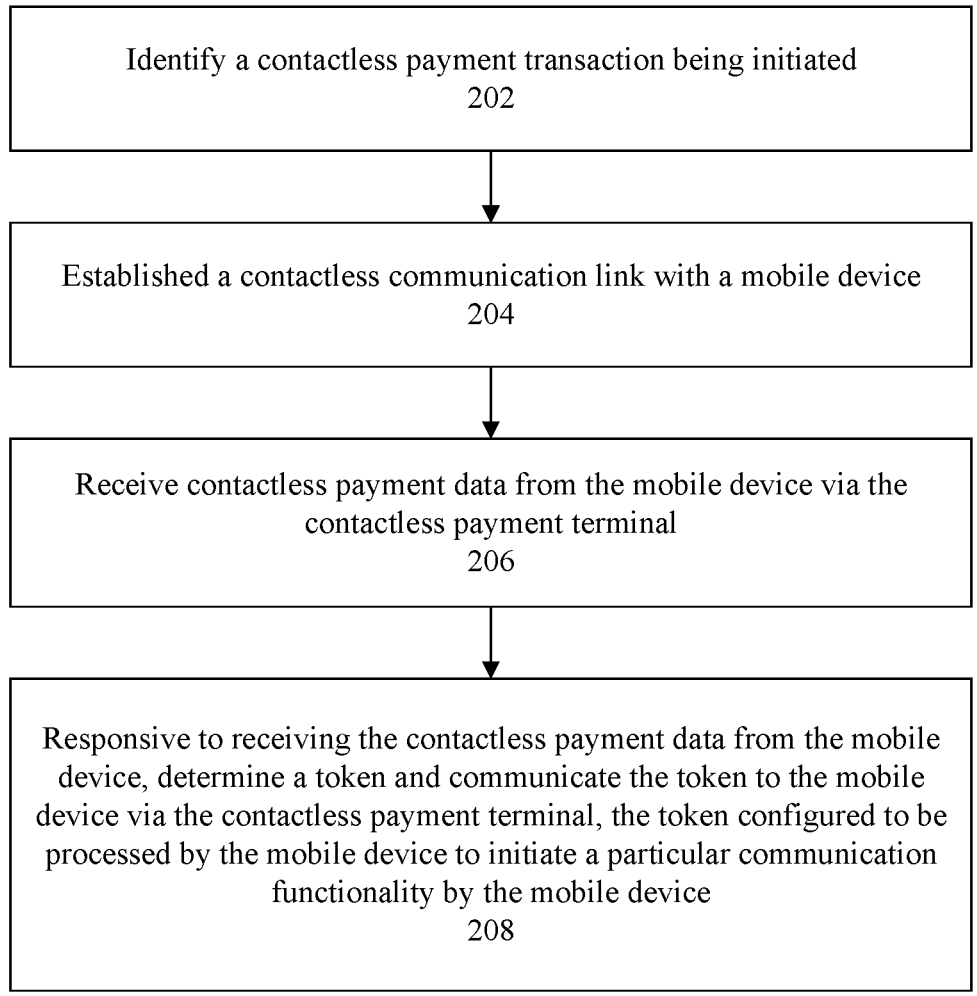
FIG. 2 is a flow chart illustrating an example of a method of communicating a token to a mobile device.

FIG. 2 is a flow chart illustrating an example of a method 200 of communicating a token to the mobile device 120. At step 202, the point of sale system 110 (e.g., the point of sale application 130) can identify a contactless payment transaction being initiated using techniques known in the art. At step 204, the point of sale system 110 can initiate the contactless payment terminal 115 to establish a communication link with the mobile device 120. In illustration, the point of sale system 110 can communicate to the contactless payment terminal 115 polling commands, which the contactless payment terminal can communicate to the mobile device 120. In response to receiving the polling commands, the mobile device 120 can establish a contactless communication link (e.g., a NFC link) with the contactless payment terminal 115.

At step 206, the point of sale system 110 can receive contactless payment data from the mobile device 120 via the contactless payment terminal 115. At step 208, responsive to receiving the contactless payment data from the mobile device 120, the point of sale system 110 can determine a token 155 and communicate the token 155 to the mobile device 120 via the contactless payment terminal 115, the token 155 configured to be processed by the mobile device 120 to initiate a particular communication functionality by the mobile device 120.

Figure 3:
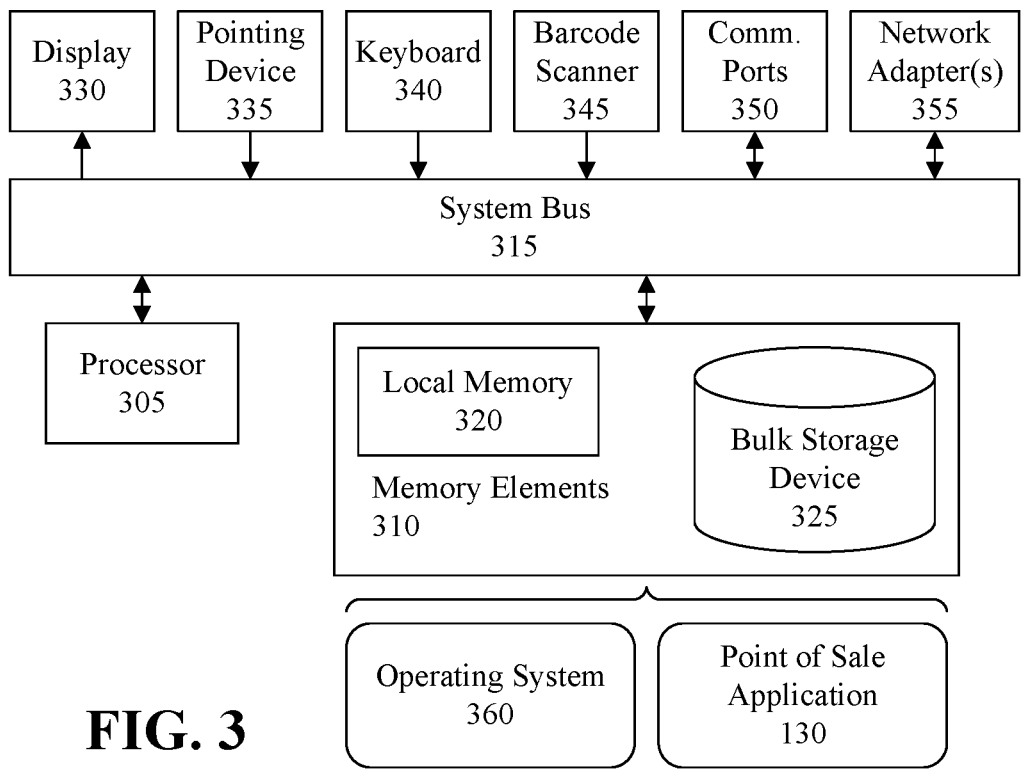
FIG. 3 is a block diagram illustrating example architecture for a point of sale system.

FIG. 3 is a block diagram illustrating example architecture for the point of sale system 110 of FIG. 1. The point of sale system 110 can include at least one processor 305 (e.g., a central processing unit) coupled to memory elements 310 through a system bus 315 or other suitable circuitry. As such, the point of sale system 110 can store program code within the memory elements 310. The processor 305 can execute the program code accessed from the memory elements 310 via the system bus 315. It should be appreciated that the point of sale system 110 can be implemented in the form of any system including a processor and memory that is capable of performing the functions and/or operations described within this specification as being performed by the point of sale system 110. For example, the point of sale system 110 can be implemented as a computer, a mobile computer, a tablet computer, a laptop computer, a netbook computer, a computer specifically configured to perform point of sale operations, and so on.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The point of sale system 110 also can include one or more cache memories (not shown) that provide temporary storage of at least some program code in order to reduce the number of times program code must be retrieved from the bulk storage device 325 during execution.

Input/output (I/O) devices, for example a display 330, a pointing device 335, a keyboard 340 and a barcode scanner 345, can be coupled to the point of sale system 110. The I/O devices can be coupled to the point of sale system 110 either directly or through intervening I/O controllers. For instance, the display 330 can be coupled to the point of sale system 110 via a graphics processing unit (GPU), which may be a component of the processor 305 or a discrete device. One or more communication ports 350 also can be coupled to point of sale system 110 to enable the point of sale system 110 to become coupled to other systems (e.g., the contactless payment terminal 115), printers (e.g., a receipt printer), etc. As noted, in one arrangement, the contactless payment terminal 115 of FIG. 1 can be a component of the point of sale system 110. In such an arrangement, the contactless payment terminal 115 can be coupled to the system bus 315 via an intervening I/O controller.

One or more network adapters 355 also can be coupled to point of sale system 110 to enable the point of sale system 110 to become coupled to other systems, computer systems, remote storage devices and/or remote printers through intervening private or public networks. Modems, cable modems, transceivers, and Ethernet cards are examples of different types of network adapters 355 that can be used with the point of sale system 110.

As pictured in FIG. 3, the memory elements 310 can store the components of the point of sale system 110, namely an operating system 360 and the point of sale application 130. Being implemented in the form of executable program code, these components of the point of sale system 110 can be executed by the point of sale system 110 and, as such, can be considered part of the point of sale system 110. Moreover, the operating system 360 and the point of sale application 130 are functional data structures that impart functionality when employed as part of the point of sale system 110.

Figure 4:
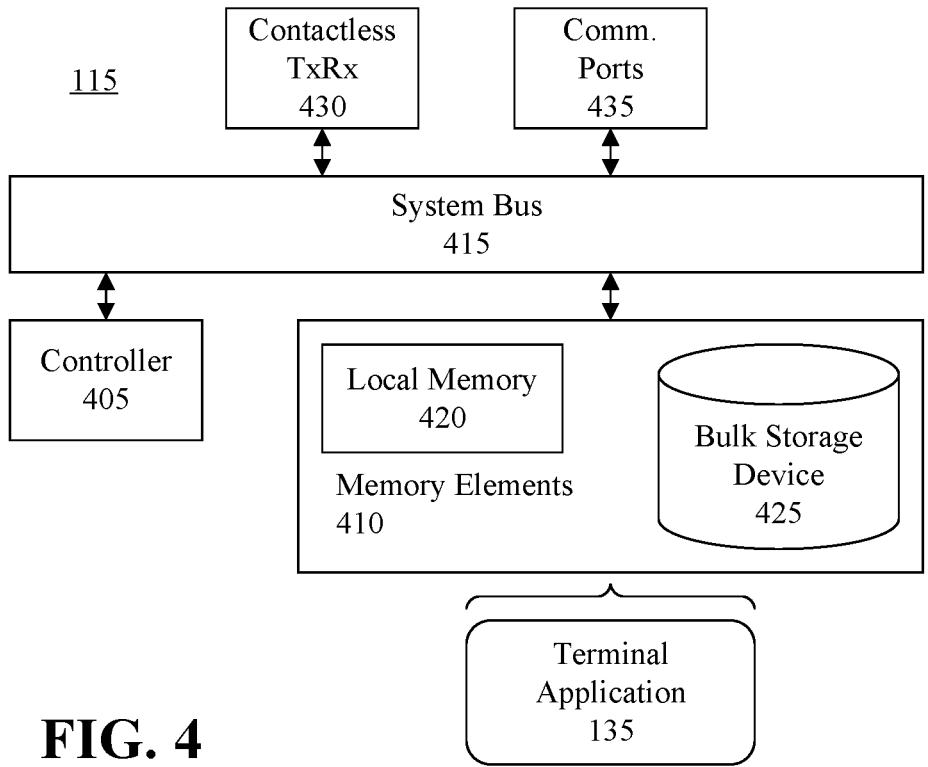
FIG. 4 is a block diagram illustrating example architecture for a contactless payment terminal.

FIG. 4 is a block diagram illustrating example architecture for the contactless payment terminal 115 of FIG. 1. The contactless payment terminal 115 can include at least one controller 405 coupled to memory elements 410 through a system bus 415 or other suitable circuitry. As such, the contactless payment terminal 115 can store program code within the memory elements 410. The controller 405 can execute the program code accessed from the memory elements 410 via the system bus 415. It should be appreciated that the contactless payment terminal 115 can be implemented in the form of any system including a controller and memory that is capable of performing the functions and/or operations described within this specification as being performed by the contactless payment terminal 115.

The memory elements 410 can include one or more physical memory devices such as, for example, local memory 420 and one or more bulk storage devices 425. The contactless payment terminal 115 also can include one or more cache memories (not shown) that provide temporary storage of at least some program code in order to reduce the number of times program code must be retrieved from the bulk storage device 425 during execution. In an arrangement in which the contactless payment terminal 115 is integrated into the point of sale system 110 as an internal component, the memory elements 410 can be the memory elements 310 of FIG. 3 and the system bus 415 can be the system bus 315 of FIG. 3.

A contactless transceiver (e.g., NFC transceiver) 430 can be coupled to the controller 405 via the system bus 415 to enable the contactless payment terminal 115 to establish contactless communication links with other devices, for example the mobile device 120 of FIG. 1. Contactless transceivers are known in the art. One or more communication ports 435 can be coupled to the controller 405 via the system bus 415 to enable the contactless payment terminal 115 to communicate with other systems, for example the point of sale system 110 of FIG. 1, for example in an arrangement in which the contactless payment terminal 115 is external to the point of sale system 110.

As pictured in FIG. 4, the memory elements 410 can store the components of the contactless payment terminal 115, namely the terminal application 135. Being implemented in the form of executable program code, the terminal application 135 can be executed by the contactless payment terminal 115 and, as such, can be considered part of the contactless payment terminal 115. Moreover, the terminal application 135 is a functional data structures that imparts functionality when employed as part of the contactless payment terminal 115. In an arrangement in which the contactless payment terminal 115 is not a component of the point of sale system 110, the memory elements 410 also can store an operating system (not shown) for the contactless payment terminal 115.

Figure 5:
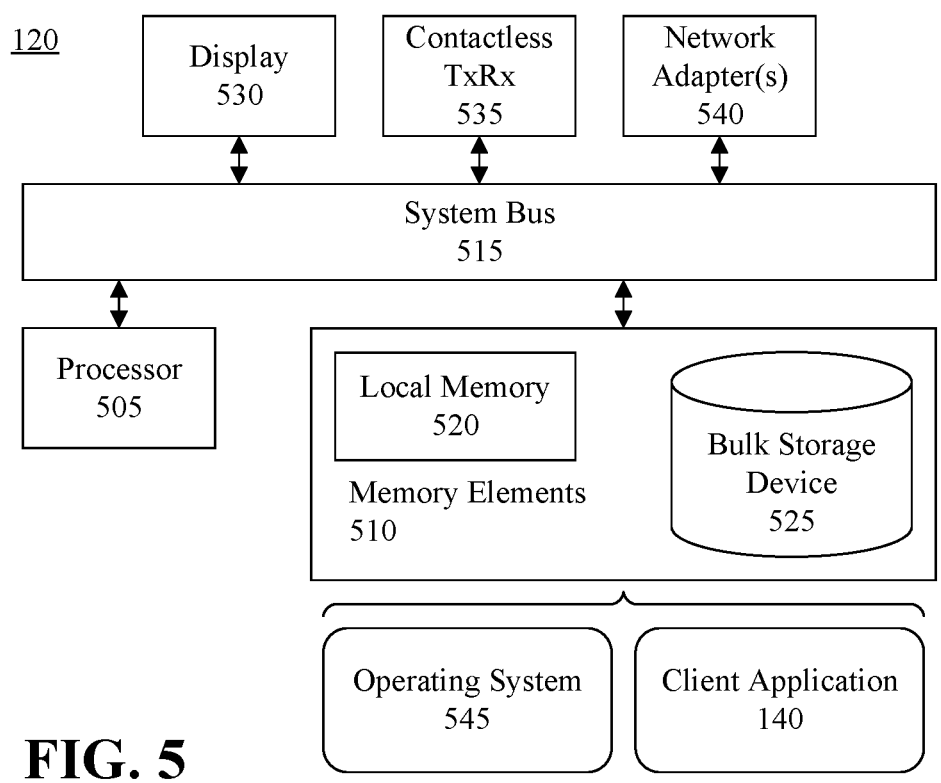
FIG. 5 is a block diagram illustrating example architecture for a mobile device.

FIG. 5 is a block diagram illustrating example architecture for the mobile device 120 of FIG. 1. The mobile device 120 can include at least one processor 505 (e.g., a central processing unit) coupled to memory elements 510 through a system bus 515 or other suitable circuitry. As such, the mobile device 120 can store program code within the memory elements 510. The processor 505 can execute the program code accessed from the memory elements 510 via the system bus 515. It should be appreciated that the mobile device 120 can be implemented in the form of any device including a processor and memory that is capable of performing the functions and/or operations described within this specification as being performed by the mobile device 120. For example, the mobile device 120 can be implemented as a smart phone, a tablet computer, a smart watch, smart glasses, and so on.

The memory elements 510 can include one or more physical memory devices such as, for example, local memory 520 and one or more bulk storage devices 525. The mobile device 120 also can include one or more cache memories (not shown) that provide temporary storage of at least some program code in order to reduce the number of times program code must be retrieved from the bulk storage device 525 during execution.

Input/output (I/O) devices, for example a display 530 (e.g., a touch screen, etc.), can be coupled to the processor 505 via the system bus 415. The I/O devices can be coupled to the processor 505 either directly or through intervening I/O controllers. A contactless transceiver 535 (e.g., NFC transceiver) also can be coupled to the processor 505 via the system bus 415 to enable the contactless payment terminal 115 to establish contactless communication links with other devices, for example the contactless payment terminal 115 of FIG. 1. One or more network adapters 540 also can be coupled to mobile device 120 to enable the mobile device 120 to become coupled to other systems, computer systems, remote printers, and/or remote storage devices through intervening private or public networks. WiFi™ transceivers, Bluetooth® transceivers, and BLE transceivers are examples of different types of network adapters 540 that can be used with the mobile device 120.

As pictured in FIG. 5, the memory elements 510 can store the components of the mobile device 120, namely an operating system 545 and the client application 140. Being implemented in the form of executable program code, the operating system 545 and the client application 140 can be executed by the mobile device 120 and, as such, can be considered part of the mobile device 120. Moreover, operating system 545 and the client application 140 are functional data structures that impart functionality when employed as part of the mobile device 120.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   via a contactless payment terminal, receiving contactless payment data from a mobile device during a purchase transaction; and
   responsive to receiving the contactless payment data from the mobile device, communicating a token to the mobile device via the contactless payment terminal, the token being a data file indicating the mobile device is authorized to access a media presentation system to initiate playback of a specified number of content on the media presentation system, the specified number of content determined, at least in part, based on an amount of money spent during the purchase transaction via the contactless payment terminal; the token comprising data enabling the mobile device to operate as a digital key; wherein the mobile device initiates a communication functionality that enables the mobile device to start a vehicle;
   wherein, responsive to the mobile device establishing a communication link with the media presentation system, the media presentation system communicates to the mobile device a menu of available content from which a user selects content for presentation on the media presentation system, the menu indicating the specified number of content and the media presentation system configuring the menu to only allow the user to select up to the specified number of content for presentation on the media presentation system.

2. The method of claim 1, wherein:
   the token specifies an amount of time the mobile device is authorized to use a communication network; and
   responsive to the mobile device authenticating with the communication network and using the communication network for the specified amount of time, the mobile device is automatically disconnected from the communication network.

3. The method of claim 1, wherein:
   the token comprises data enabling the mobile device to operate as a digital key; and
   the mobile device initiates a communication functionality that enables the mobile device to open a lock.

4. The method of claim 1, wherein:
   the token comprises data configured to enable the mobile device to initiate a content presentation system to present content; and
   the mobile device initiates a communication functionality that enables the mobile device to initiate the content presentation system to present the content.

* * * * *